United States Patent [19]

Jones

[11] Patent Number: 5,353,110
[45] Date of Patent: Oct. 4, 1994

[54] METHOD AND APPARATUS FOR CARRYING OUT OPTICAL TIME DOMAIN REFLECTOMETRY USING WEIGHING TECHNIQUES

[75] Inventor: Michael D. Jones, Portland, Oreg.
[73] Assignee: Tektronix, Inc., Wilsonville, Oreg.
[21] Appl. No.: 729,305
[22] Filed: Jul. 12, 1991
[51] Int. Cl.$^5$ .................. G01N 21/00; G01N 21/88
[52] U.S. Cl. ........................... 356/73.1; 250/227.21
[58] Field of Search .................. 356/73.1; 250/227.21

[56] References Cited

U.S. PATENT DOCUMENTS

| | | | |
|---|---|---|---|
| 4,743,753 | 5/1988 | Cheng et al. | 356/73.1 |
| 4,812,038 | 3/1989 | Nazarathy et al. | 356/73.1 |
| 4,968,880 | 11/1990 | Beller | 356/73.1 |
| 5,000,568 | 3/1991 | Trutna, Jr. et al. | 356/73.1 |

Primary Examiner—Vincent P. McGraw
Assistant Examiner—Peter J. Rashid
Attorney, Agent, or Firm—John D. Winkelman; Francis I. Gray; William A. Birdwell

[57] ABSTRACT

An optical time domain reflectometry method and apparatus that employs Hadamard transforms to increase the signal-to-noise ratio. A sequence of N pulses of light corresponding to a Hadamard derived code are launched down a fiber optic cable for each of N such codes. Selected combinations of pulses of reflected light are transformed by a Hadamard derived matrix to a set of equations that are solved simultaneously to determine the power reflected from each of N points. Where a Hadamard code is used the average mean square error is reduced by a factor of 1/N. Where a simplex code is employed the average mean square error is reduced by a factor of $4N/(1+N)^2$. In addition, N measurements of the power reflected at each point are computed and averaged.

33 Claims, 5 Drawing Sheets

METHOD AND APPARATUS FOR CARRYING OUT OPTICAL TIME DOMAIN REFLECTOMETRY USING WEIGHING TECHNIQUES

BACKGROUND OF THE INVENTION

This invention relates to methods and apparatuses for carrying out optical time domain reflectometry, particularly to the use of weighing techniques to improve the signal-to-noise ratio of reflected optical power measurements in optical time domain reflectometry.

In optical time domain reflectometry, as applied to a fiber optic cable, a pulse of light is launched, or transmitted, down the fiber from one end and the amount of light power reflected back to that end is measured as a function of time. Since the velocity of light in the fiber is known, the power reflected from any given distance down the fiber can therefore be determined. The operations of launching a pulse into the fiber and detecting the optical power level leaving the fiber are repeated for a large number of different time delay values, and the resulting data is used to form a display that represents fiber condition as a function of distance. This allows the quality of the fiber to be determined and, often more importantly, permits the existence of any significant discontinuity in the fiber or fiber system to be identified and its effect to be measured.

The reflected power comes from either Fresnel reflections, off a connector for example, or from Rayleigh backscatter. Rayleigh backscatter results from randomly dispersed anomolies in the index of refraction of the fiber. In contrast to the Fresnel reflections, Rayleigh backscatter is very weak, typically 40 dB or more less than the launch power. Consequently, the ability of an optical time domain reflectometer ("OTDR") to measure Rayleigh backscatter is limited by the noise in the receiver itself, and various techniques have been used to increase the signal-to-noise ratio.

In addition, the distance resolution of an OTDR customarily depends on the length of the pulse in the fiber (pulse period times the velocity of the light in the fiber). More specifically, the resolution is one half the pulse length. However, the amplitude resolution is directly proportional to the total energy of the pulse (pulse period times the power of the energy source). Since the light source has a fixed maximum power, there is a tradeoff between distance resolution and amplitude resolution. This tradeoff can be alleviated by increasing the signal-to-noise ratio of the reflected energy, thereby increasing the amplitude resolution or, alternatively, permitting the distance resolution to be increased by decreasing the pulse length.

Techniques used to increase the signal-to-noise ratio include high speed averaging, spread spectrum techniques using Golay codes and coherent optical detection. Correlation techniques using various codes are described in P. Healy, "Complementary Correlation OTDR With Three Codewords", *Electron. Lett.*, 1990, 26, pp. 70-71; P. Healy, "Complementary Code Sets for OTDR", *Electron. Lett.*, 1989, 25, pp. 692-693; P. Healy, "Optical Orthogonal Pulse Compression Codes by Hopping", *Electron. Lett.*, 1981, 17, pp. 970-971. The use of Golay codes is described in Cheng et al. U.S. Pat. No. 4,743,753. While these techniques have been effective, further increases in sensitivity and signal-to-noise ratio are still needed.

In the invention described hereafter weighing designs have been employed to improve the signal-to-noise ratio of an optical time domain reflectometer. A weighing design is a scheme for accurately weighing a number of objects by weighing them in groups rather than one at a time. Where the error in weighing is independent of the weight of the objects, the mean square error $\epsilon$ can be reduced by a weighing design. Where i objects are weighed separately, the measured weight $\mu_i$ of the ith object is the actual weight $\tau_i$ plus some error $e_i$. That is:

$$\mu_i = \tau_i + e_i$$

The best estimate of the weight $\hat{\tau}_i$ can therefore be expressed as $\tau_i + e_i$. It follows that:

$$e_i = \hat{\tau}_i - \tau_i$$

The expected value of the square of the error, that is, the mean square error, is expressed as $E\{e_i^2\}$, where E denotes expected value. For a single measurement the mean square error is equal to the variance $\sigma^2$. Here, it can also be expressed as:

$$E\{(\hat{\tau}_i - \tau_i)^2\} = v^2$$

For example, suppose that the weighing is performed using a chemical balance with two pans, and that four objects are to be weighed, as follows:

$$\mu_1 = \tau_1 + \tau_2 + \tau_3 + \tau_4 + e_1$$

$$\mu_2 = \tau_1 - \tau_2 + \tau_3 - \tau_4 + e_2$$

$$\mu_3 = \tau_1 + \tau_2 - \tau_3 - \tau_4 + e_3$$

$$\mu_4 = \tau_1 - \tau_2 - \tau_3 + \tau_4 + e_4$$

This means that in the first weighing all four objects are placed in the left hand pan, in the second weighing objects 1 and 3 are placed in the left hand pan, and 2 and 4 in the right hand pan, and so forth.

The best estimate of the weights can be found by solving these equations simultaneously for $\tau_1$, $\tau_2$, $\tau_3$ and $\tau_4$. For example, it can be shown that:

$$\hat{\tau}_1 = \tfrac{1}{4}(\mu_1 + \mu_2 + \mu_3 + \mu_4)$$

and that:

$$\hat{\tau}_1 = \tau_1 + \tfrac{1}{4}(e_1 + e_2 + e_3 + e_4)$$

Consequently, the mean square error is:

$$E\{(\hat{\tau}_1 - \tau_1)^2\} = E\{1/16(e_1 + e_2 + e_3 + e_4)\} = \tfrac{1}{4}\sigma^2$$

In general, it can be shown for this case that:

$$E\{(\hat{\tau}_i - \tau_i)^2\} = \tfrac{1}{4}\sigma^2$$

That is, by weighing the four objects together, the mean square error can be reduced by a factor of $\tfrac{1}{4}$.

The signal-to-noise ratio for a weighing design is defined as the ratio of the true weight of the ith object divided by the standard deviation $\sigma$ of the error in the measurement. That is:

$$\frac{\tau_i}{\sqrt{E\{(\hat{\tau}_i - \tau_i)^2\}}}$$

Another weighing design is based on a spring balance having only one pan. Only coefficients 0 and 1 can be used; that is, an object is either weighed or it is not. For example, one method of weighing is:

$$\mu_1 = \tau_1 \quad\quad\quad + \tau_3 + e_1$$
$$\mu_2 = \quad\quad + \tau_2 + \tau_3 + e_2$$
$$\mu_3 = \tau_1 + \tau_2 \quad\quad + e_3$$

By solving these equations simultaneously for $\tau_1$ through $\tau_3$, it can be shown that the mean square errors are reduced. For example:

$$\tau_1 = .5(\mu_1 + \mu_2 + \mu_3)$$

and $$E\{(\tau_1 - \tau_1)^2\} = E\{[.5(\mu_1 + \mu_2 + \mu_3) - \tau_1]^2\}$$
$$= \tfrac{3}{4} E\{e_1^2\} = \tfrac{3}{4}\sigma^2$$

Weighing designs are described by a square, $N \times N$ matrix, where the rows of the matrix correspond to the weighing event and the columns correspond to the position of the object in the weighing event. The matrix therefore acts as a transform that changes a set of measurements to a set of equations. In a chemical balance weighing design the values in the matrix may take on +1, 0 or −1. In a spring balance weighing design the values may only be 0 or +1.

The best weighing designs use Hadamard matrices for chemical balance designs and simplex matrices ("S-matrices") for spring balance designs. A Hadamard matrix $H_N$ of order N is an $N \times N$ matrix of +1's and −1's with the property that the scalar product of any two distinct rows is 0. A normalized Hadamard matrix is one in which all elements of the first row and the first column are +1. If $H_N$ is a normalized Hadamard matrix, an S-matrix is the $(N-1) \times (N-1)$ matrix of 0's and +1's obtained by (a) omitting the first row and the first column of $H_N$, and (b) changing the +1's to 0 and the −1's to 1's. The rows of an S-matrix are codewords in a simplex code. The rows of a Hadamard matrix are referred to herein as codewords in a Hadamard code and are orthogonal.

Ideally, a weighing design should minimize the mean square error $\epsilon_i$ for all i simultaneously. Where this is impossible, other criteria are used. A weighing design is said to be "A-optimal" if it minimizes the average of the mean square error, that is:

$$\epsilon = \frac{1}{N}(\epsilon_1 + \epsilon_2 + \ldots + \epsilon_N)$$

It can be shown that the average mean square error for a Hadamard matrix is:

$$\epsilon = \frac{1}{N}\sigma$$

and that the average mean square error for an S-matrix is given by:

$$\epsilon = \frac{4N\sigma^2}{(N+1)^2}$$

For large N, S-matrices are within a few percent of being A-optimal.

The forgoing information has been derived from M. Harwit and N. Sloan, *Hadamard Transform Optics.*, 6–17 (1979, Academic Press, Inc.), ISBN 0-12-330050-9.

SUMMARY OF THE INVENTION

The present invention further improves the signal-to-noise ratio achieved in optical time domain reflectometry through the use of a method and an apparatus that employ Hadamard, or Hadamard derived, codes. A number N of light pulses are launched down a fiber as a set of Hadamard codes or a set of S-codes, each having N elements. By measuring the power reflected back out of the fiber at selected times, the sum of the power reflected from predetermined combinations of N points within the fiber can be determined. The sums, or data sets, are part of a set of N unknowns (the power reflected from the N points) which are solved simultaneously to determine the powers of light reflected from N points, thereby reducing the average mean square error of measurement from $\sigma^2$ for one pulse to:

$$\frac{\sigma^2}{N}$$

for a Hadamard code, and:

$$\frac{4N\sigma^2}{(N+1)^2}$$

for an S-code, where N=the number of pulses.

In addition, reflections are measured over many time periods, typically much larger than N, so there are N such computed powers for each data point. These are averaged as well, to further reduce the error and increase the signal-to-noise ratio.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
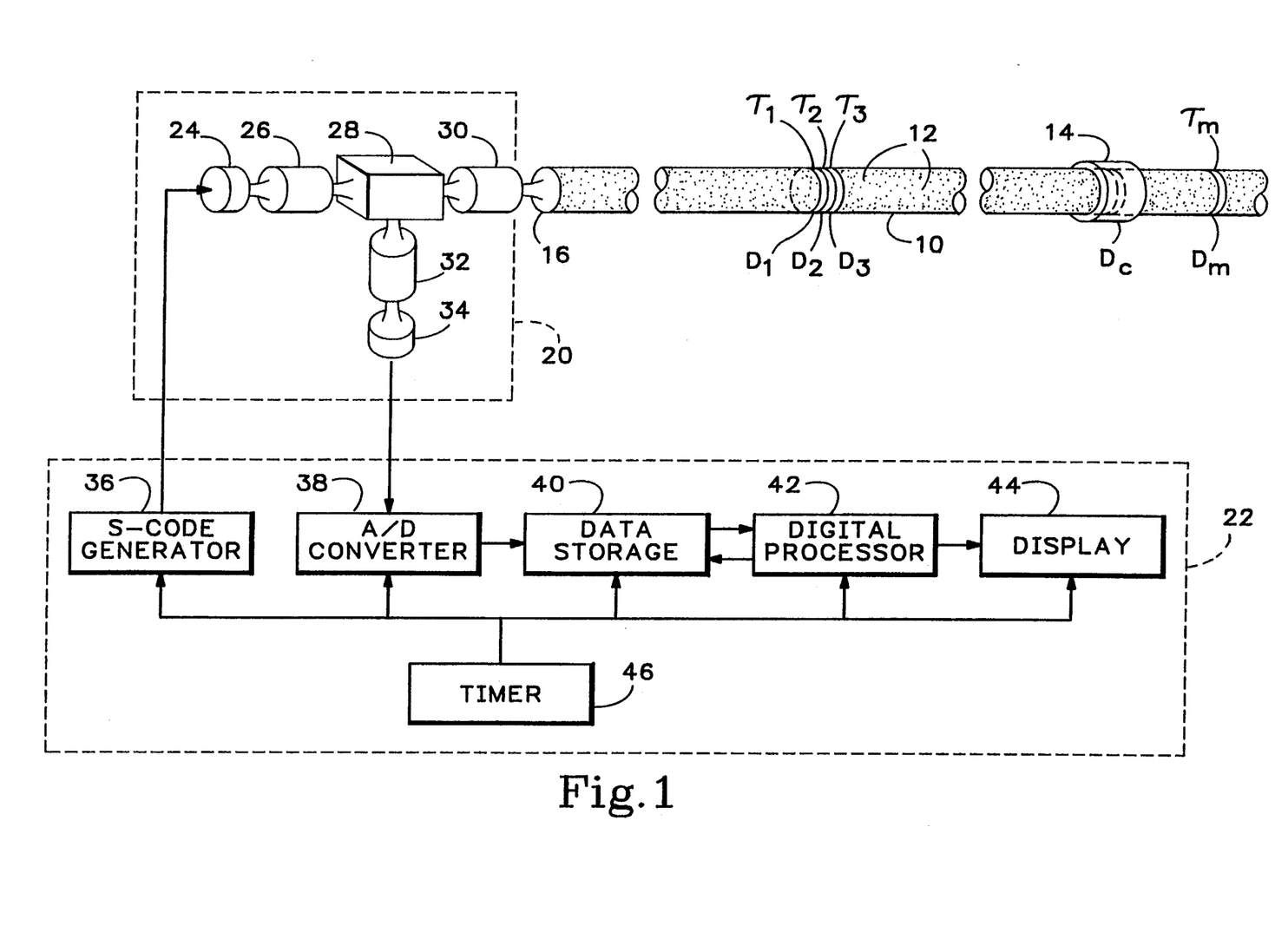
FIG. 1 is an illustration of a fiber optic cable system, exaggerated in relative dimensions, together with a block diagram of an OTDR system according to the principles of the present invention.

FIG. 1 shows an optical fiber 10, and a test system according to the present invention as discussed below. The fiber has randomly distributed anomalies 12 in its index of refraction, which cause light to be reflected and absorbed, thereby producing generally continuous power loss for a pulse of light traveling down the fiber. A fiber is often part of an optical transmission system which includes at least one fiber connector 14. The connector also typically causes Fresnel reflection which is much larger in magnitude than the Rayleigh backscatter caused by the distributed anomalies over the same distance.

Figure 2:
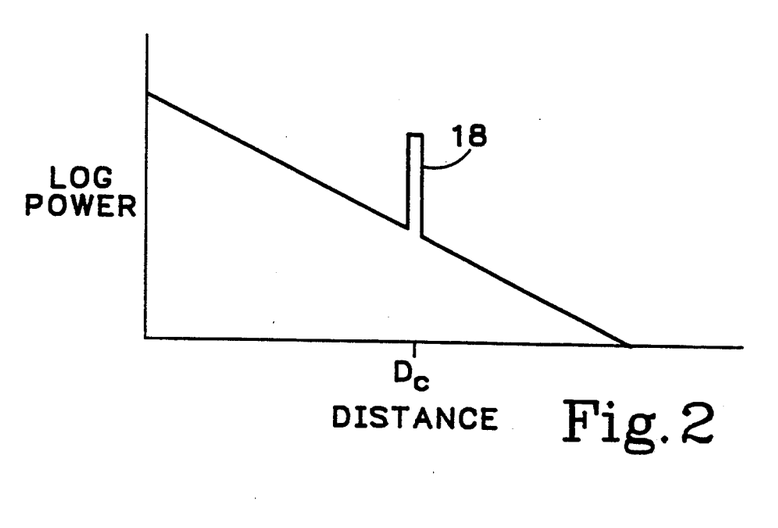
FIG. 2 is a typical plot of the log of reflected power as a function of distance along an optical fiber under test in the application of an OTDR.

In FIG. 2, which shows a typical plot of the log of reflected power as a function of distance down the fiber for a fiber system as shown in FIG. 1, it can be seen that the power reflected back to the insertion end 16 of the fiber 10 decreases exponentially with distance. However, the connector 14 produces a large reflection at distance $D_c$, as indicated by the discontinuity 18 in the curve of FIG. 2.

The reflectivity of any infinitesimal slice of the fiber system at any given point distance $D_m$ from the insertion end 16 is represented by $\tau_m$. The reflectivities at three consecutive points at distances $D_1$, $D_2$ and $D_3$ from the insertion end 18 are represented by $\tau_1$, $\tau_2$ and $\tau_3$. These points may be thought of as partially reflective mirrors for the purpose of explanation of the present invention.

In the present invention, the signal-to-noise ratio of the reflectivity measurements is increased by "weighing" the reflectivities at N consecutive points along the fiber simultaneously. That is, by using a set of coded sequences of pulses, the reflected energy for predetermined time periods can be made to represent the total energy reflected from a predetermined combination of points along the fiber. These combinations may then be employed to compute the energy reflected from each such point, in the same manner as a weighing design, to reduce the mean square error and increase the signal to noise ratio. Just as the signal-to-noise ratio for a weighing design is defined as the ratio of the true weight of the ith object divided by the standard deviation $\sigma$ of the error in the measurement, the signal-to-noise ratio of a communications system can be expressed as the true amplitude of the signal divided by the standard deviation of the error in the amplitude measurement.

While many orthogonal sets of N codes having N elements (pulses) could be employed in the present invention, Hadamard derived codes are preferred. In addition, while a Hadamard code could itself be used, that would require either a three power level energy source, or the transmission of two bi-level codes and the substraction of their results to produce Hadamard codes. Consequently, S-codes are preferred because they lend themselves particularly well to an optical communications systems, in which light is readily launched by a laser diode or similar source in on ("1") or off ("0") pulses.

The distance resolution $R_d$ of the invention is determined by the pulse length of the code elements. That is, $R_d = L_e/2$, where $L_e$ is the element length (element period $P_e$ times the velocity of light in the fiber V). The length of each code $L_c$ is determined by the number of code elements N and the distance resolution $R_d$. That is, $L_c = N \times R_d \times 2$. The code length should be twice the product of the distance resolution and the number of elements to ensure that the amplitude of the leading element of light reflected at a given point can be combined with the amplitude of the trailing element of light reflected at a later time. This permits all possible combinations of elements in the code to be produced as reflected pulses at the insertion end, though not all combinations would ordinarily be used, particularly where an S-code is used.

Figure 3:
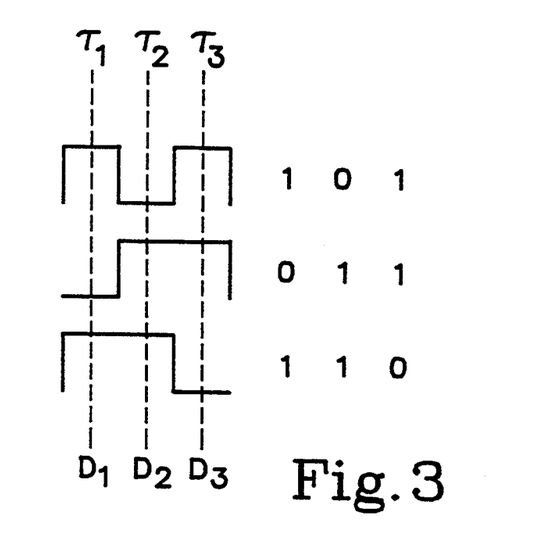
FIG. 3 is an illustration of the spatial relationship of the waveform of three weighing codes in relation to the points at which reflectivity is to be weighed according to the principles of the present invention, set opposite the respective codes themselves.
Figure 4:
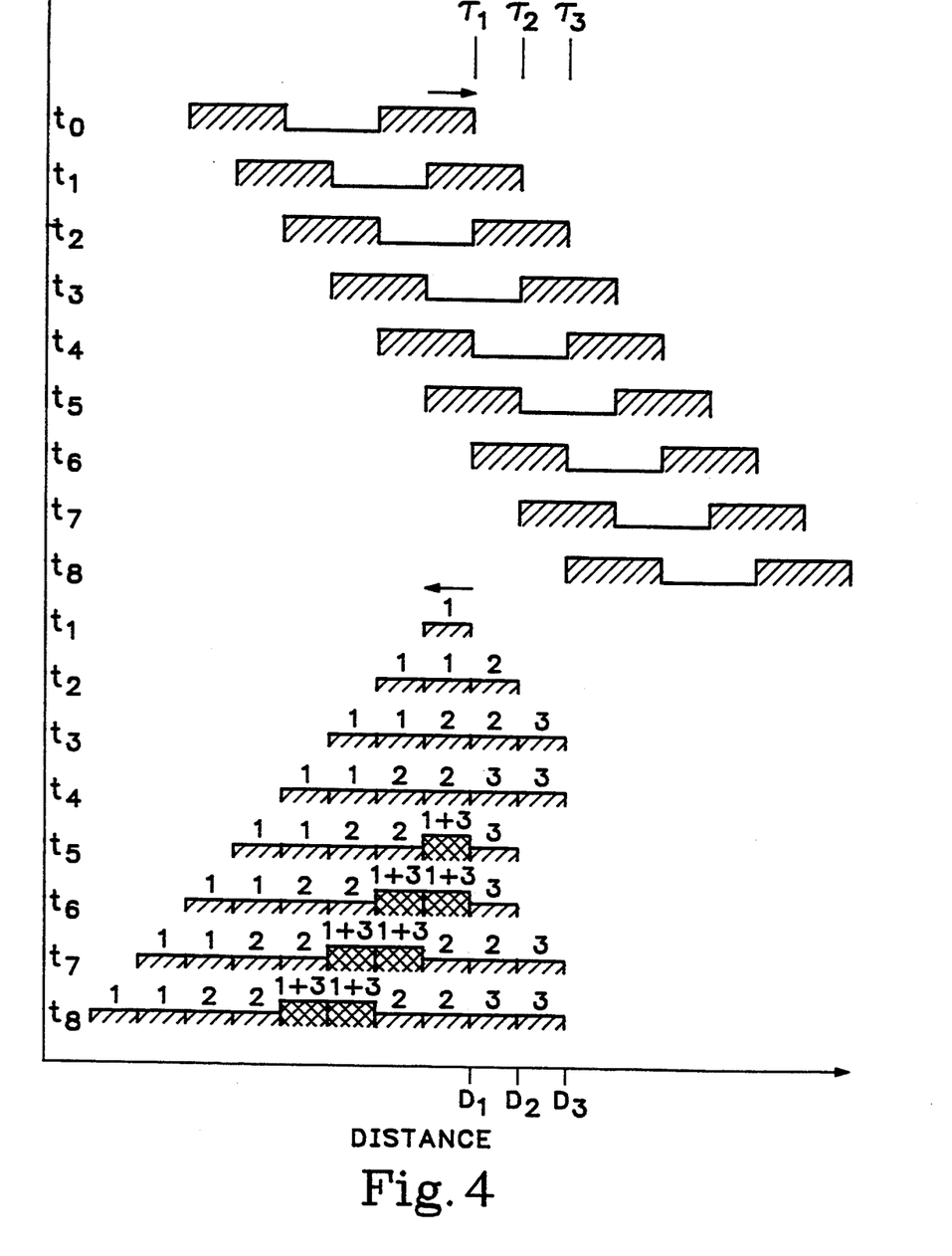
FIG. 4 is an illustration of the progression of an S-code past three points to be measured, and the return progression of the reflected energy, during optical time domain reflectometry according to the principles of the present invention.

By way of example, but not of limitation, the application of an S-code where N=3 is shown in FIGS. 3 and 4. In FIG. 3 the three possible codes 101, 011 and 110 are shown in spatial relation to three distances $D_1$, $D_2$ and $D_3$, having reflectivities $\tau_1$, $\tau_2$ and $\tau_3$, respectively. This illustrates the reflectivities that are "weighed" together (those corresponding to a "1") for a predetermined time period following the launch of a code down the fiber.

The top half of FIG. 4 shows the progression of a 101 code by the points at distances $D_1$, $D_2$ and $D_3$, and the bottom half shows the resultant energy reflected back to the insertion end of the fiber by each element of the code. The point from which the energy is reflected is shown in the bottom half by a number 1, 2 or 3 over the time segment of energy illustrated. At time $t_0$ the leading edge of the first element of the code is just arriving at the point $D_1$ having reflectivity $\tau_1$. At time $t_8$ the trailing edge of the last element of the code has just passed the point $D_3$ having reflectivity $\tau_3$. During times $t_1$ through $t_4$ the only reflected energy is from one of the points. At time $t_5$ a pulse representing the total energy reflected from both points 1 and 3 has begun to travel back to the insertion end, and at the end of time $t_6$ that pulse is completely formed. This pulse is shown progressing back at times $t_7$ and $t_8$. Similarly, it can be shown that for the 011 and 110 codes pulses representing the total energy reflected from points 1 and 2 and from points 2 and 3, respectively, are produced.

Returning to FIG. 1, a preferred system for measuring reflectivity in accordance with the present invention is shown. It comprises an optical transceiver 20 and associated signal source, processing and display circuitry 22. The transceiver comprises a light source 24, such as a laser diode; a coupling element 26, such as a lens or fiber; a splitter 28; another coupling element 30; yet another coupling element 32; and a photodetector 34. The coupling element 26 couples light from the light source 24 to the splitter 28, which permits light to be launched down the fiber 10 through coupling element 30. The splitter also causes light reflected back out of the insertion end 16 of the fiber to be directed through coupling element 32 to photodetector 34. It is to be recognized that other transceiver configurations could be used without departing from the principles of the invention.

The circuitry 22 includes an S-code generator 36, connected to drive the light source 24, preferably in an on/off fashion, though a three level output could be generated if a Hadamard code were used. The code generator could simply store the codes and send them when triggered, or it could compute the codes each time they are needed.

The circuitry also includes an analog-to-digital converter 38, for digitizing the measured power of the reflected signal; a data storage device 40, such as a random access memory, for storing the digitized measurements; and a digital data processor 42 for computing the reflectivities as a function of time and distance based on the simultaneous solution of a set of N equations comprised of selected power amplitude combinations received in response to the transmission of N codes.

In addition, the circuitry includes a display 44, having associated drive circuitry as is commonly known in the art, such as a two dimensional liquid crystal display device. Ordinarily, the reflected power would be plotted on the display as a function of time or distance down the fiber.

At least the S-code generator 36, the analog-to-digital converter 38 and the data storage 40 would ordinarily be synchronized by a timer, or clock, 46. The digital processor 42 and display 44 may also be driven by the timer. It is to be recognized that other circuitry could be used without departing from the principles of the invention.

Figure 5A:
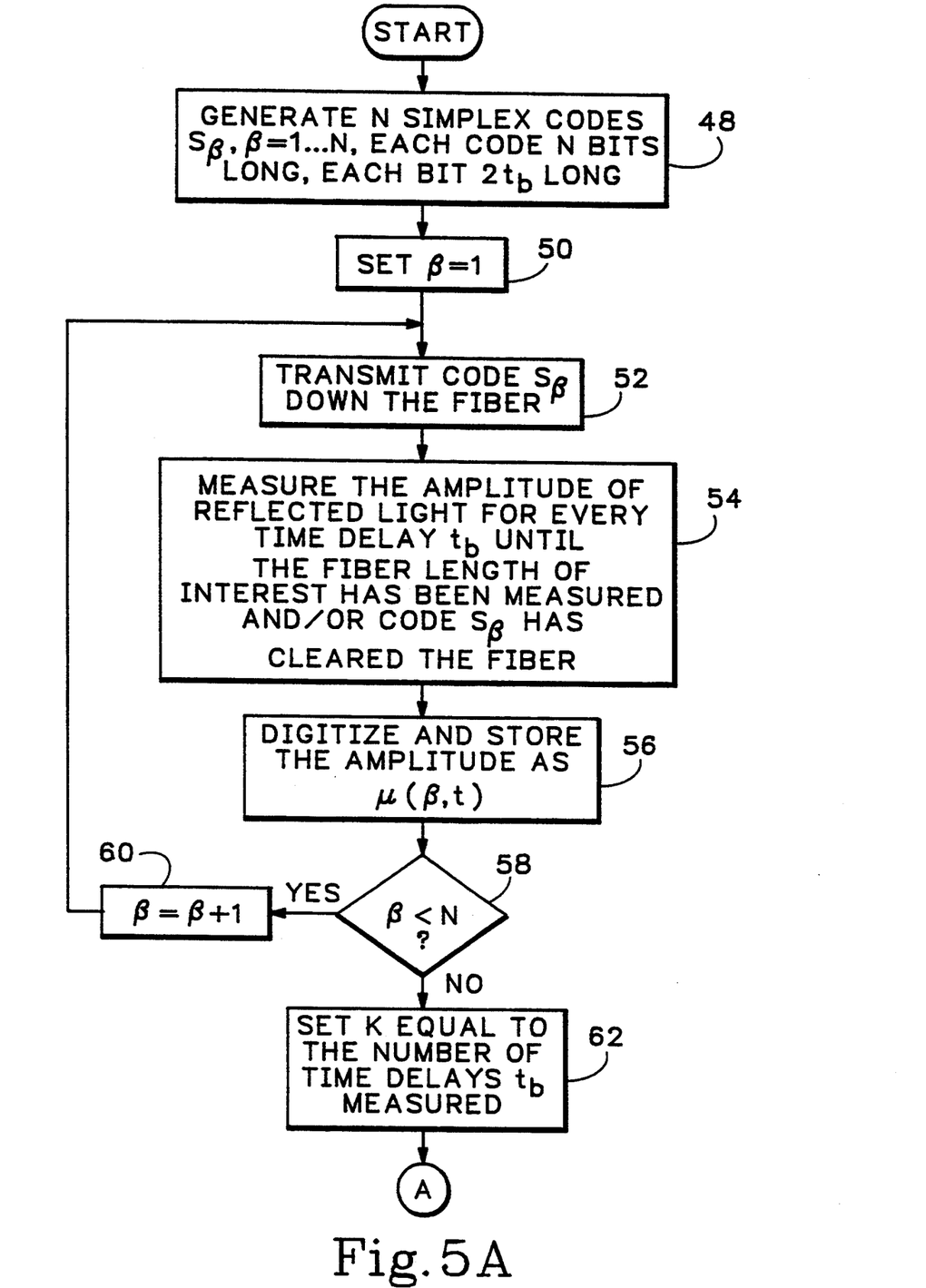
FIGS. 5A and 5B show a flow chart for a preferred method of carrying out optical time domain reflectometry according to the principles of the present invention.
Figure 5B:
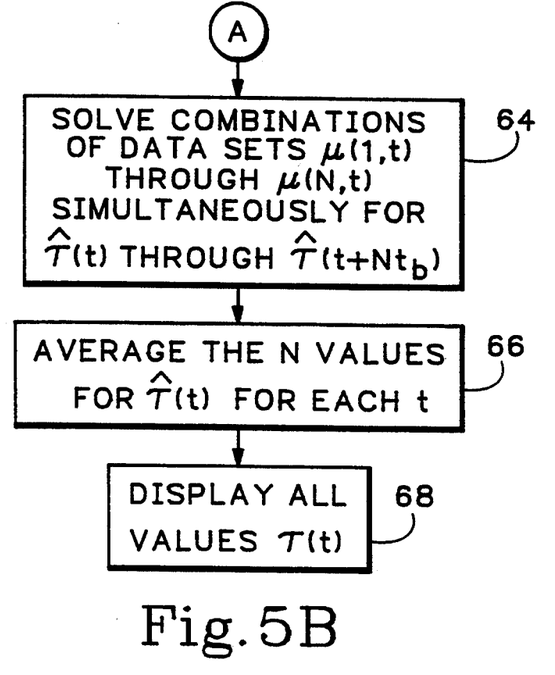

A preferred method for implementing the present invention is shown by the flow chart in FIGS. 5A and 5B. First, at step 48, N S-codes $S_\beta$, where $\beta=1$ through N, are generated. Each code is N bits long, each bit being twice a time unit $t_b$. In practice, the codes may be generated as needed, or they may be generated beforehand, stored and retrieved as needed.

In step 50, the counter $\beta$ is set equal to 1 and, in step 52, the code $S_\beta$ is sent down the fiber. Thereafter, in step 54, the power amplitude of the reflected light is measured for every time delay $t_\beta$ until the fiber length of interest has been measured or until the code $S_\beta$ has cleared the fiber, that is, it is no longer producing detectable reflected energy. The amplitudes for each successive unit of time delay $t_b$ are digitized and stored with the total time delay t as data points $\mu(\beta,t)$ in step 56.

A test in step 58 determines whether all the codes have been sent and, if not, $\beta$ is increased by 1 in step, 60 and steps 52, 54 and 56 are repeated for the new code. If all codes have been sent, then there will be stored N data sets $\mu(\beta,t)$ for all total time delays, i.e., distances tested. In step 62, k is set equal to the number of time intervals tested and t is set equal to zero.

In step 64 the sets of equations represented by the data sets $\mu(1,t)$ through $\mu(N,t)$ are solved simultaneously for each time delay t to obtain $\hat{r}(t)$ through $\hat{r}(t+Nt_b)$. In this way, N values for $\hat{r}$ are computed for each position along the fiber. The values of $\hat{r}(t)$ for each t (or distance) are then averaged in step 66. Thence, not only is the signal-to-noise ratio reduced by the weighing design, but it is reduced as well by averaging of multiple measurements.

In step 68, all $\tau(t)$ are displayed as a plot of reflected power as a function of time or distance, a change in slope of the curve indicating a change of reflectivity.

It is to be understood that this invention may be used for measuring media at points along an energy path other than fiber optic cable, and using energy in forms other than light, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A method of carrying out a measurement of the power of energy of a selected form reflected within a medium in which that energy propagates, comprising:
    (a) applying energy in selected form to the medium, the power at which energy is applied varying as function of time in accordance with a predetermined number N of sequential element codes, each code having N elements;
    (b) receiving energy in said selected form reflected from within said medium;
    (c) for each code, measuring the power of said energy reflected from within said medium as a function of time and assigning said power measurements as the sum of the powers reflected from a selected set of points within said medium, the number of points being equal to N; and
    (d) computing the powers reflected at said N points within said medium by solving N equations simultaneously, where each equation represents one said sum of the powers reflected from said selected set of points within said medium.

2. The method of claim 1 wherein said N points within said medium lie along an energy path between a selected first distance along that path and a second distance along that path equal to said first distance less one half the product of N times the pulse length of the code elements.

3. The method of claim 2 wherein said energy path is a fiber optic cable and said energy is in the form of light.

4. The method of claim 2 wherein steps (b), (c) and (d) are repeated for each of a plurality of selected distinct first distances, and the powers computed for a given point within said medium for each repetition, if any, are averaged to obtain a measured power value for each such point.

5. The method of claim 4 wherein each successive first distance corresponds to the product of the time that has passed since said energy was first applied to said medium times the velocity of said energy in said medium.

6. The method of claim 5, further comprising displaying the computed powers reflected from within said medium as a function of time.

7. The method of claim 5, further comprising displaying the computed powers reflected from within said medium as a function of distance along said energy path.

8. The method of claim 5 wherein said energy path is a fiber optic cable and said energy is in the form of light.

9. The method of claim 1 wherein said codes are simplex codes.

10. The method of claim 9 wherein said N points within said medium lie along an energy path between a selected first distance along that path and a second distance along that path equal to said first distance less one half the product of N times the pulse length of the code elements.

11. The method of claim 10 wherein steps (b), (c) and (d) are repeated for each of a plurality of selected distinct first distances, and the powers computed for a given point within said medium for each repetition, if any, are averaged to obtain a measured power value of each such point.

12. The method of claim 11 wherein each successive first distance corresponds to the product of the time that has passed since said energy was first applied to said medium times the velocity of said energy in said medium.

13. The method of claim 12 wherein said energy is in the form of light, said light having a first power when a code element is a one and a second, distinct power when a code element is a zero.

14. The method of claim 12 wherein said medium is a fiber optic cable and said energy is in the form of light.

15. The method of claim 1 wherein said codes are a set of orthogonal codes.

16. The method of claim 1 wherein said codes are Hadamard codes.

17. An apparatus for carrying out a measurement of the power of energy of a selected form reflected within a medium in which that energy propagates, comprising:
   (a) source means for applying energy in selected form to the medium, the power at which energy is applied varying as function of time in accordance with a predetermined number N of sequential element codes, each code having N elements;
   (b) detector means for receiving energy in said selected form reflected from within said medium;
   (c) measurement means for measuring, for each code, the power of said energy reflected from within said medium as a function of time and assigning said power measurements as the sum of the powers reflected from a selected set of points within said medium, the number of points being equal to N; and
   (d) processor means for computing the powers reflected at said N points within said medium by solving N equations simultaneously, where each equation represents one said sum of the powers reflected from said selected set of respective points within said medium.

18. The apparatus of claim 17 wherein said N points within said medium lie along an energy path between a selected first distance along that path and a second distance along that path equal to said first distance less one half the product of N times the pulse length of the code elements.

19. The apparatus of claim 18 wherein said energy path is a fiber optic cable and said energy is in the form of light.

20. The apparatus of claim 18 wherein means (b), (c) and (d) are employed repeatedly for each of a plurality of selected distinct first distances, and the powers computed for a given point within said medium for each repetition, if any, are averaged to obtain a measured power value for each such point.

21. The apparatus of claim 20 wherein each successive first distance corresponds to the product of the time that has passed since said energy was first applied to said medium times the velocity of said energy in said medium.

22. The apparatus of claim 21, further comprising means for displaying the computed powers reflected from within said medium as a function of time.

23. The apparatus of claim 21, further comprising means for displaying the computed powers reflected from within said medium as a function of distance along said energy path.

24. The apparatus of claim 21 wherein said energy path is a fiber optic cable and said energy is in the form of light.

25. The apparatus of claim 17 wherein said codes are simplex codes.

26. The apparatus of claim 25 wherein said N points within said medium lie along an energy path between a selected first distance along that path and a second distance along that path equal to said first distance less one half the product of N times the pulse length of the code elements.

27. The apparatus of claim 26 wherein means (b), (c) and (d) are employed repeatedly for each of a plurality of selected distinct first distances, and the powers computed for a given point within said medium for each repetition, if any, are averaged to obtain a measured power value for each such point.

28. The apparatus of claim 27 wherein each successive first distance corresponds to the product of the time that has passed since said energy was first applied to said medium times the velocity of said energy in said medium.

29. The apparatus of claim 28 wherein said energy is in the form of light, said light having a first power when a code element is a one and a second, distinct power when a code element is a zero.

30. The apparatus of claim 28 wherein said medium is a fiber optic cable and said energy is in the form of light.

31. The apparatus of claim 17 wherein said codes are a set of orthogonal codes.

32. The apparatus of claim 18 wherein said codes are Hadamard codes.

33. The apparatus of claim 17 further comprising means for converting the energy received from analog to digital form and said processor comprises a digital processor.

* * * * *